United States Patent
Ishiguro

(10) Patent No.: US 7,118,238 B2
(45) Date of Patent: Oct. 10, 2006

(54) APPARATUS FOR AUTOMATICALLY ADJUSTING DIRECTION OF LIGHT AXIS OF VEHICLE HEADLIGHT

(75) Inventor: Koji Ishiguro, Toyoake (JP)

(73) Assignee: Denso Corporation, Kariya (JP)

( * ) Notice: Subject to any disclaimer, the term of this patent is extended or adjusted under 35 U.S.C. 154(b) by 105 days.

(21) Appl. No.: 11/016,895

(22) Filed: Dec. 21, 2004

(65) Prior Publication Data

US 2005/0135081 A1 Jun. 23, 2005

(30) Foreign Application Priority Data

Dec. 22, 2003 (JP) .............................. 2003-425567

(51) Int. Cl.
*B60Q 1/12* (2006.01)
*B60Q 1/26* (2006.01)
*B60Q 1/34* (2006.01)
*B60L 1/14* (2006.01)

(52) U.S. Cl. ........................ 362/37; 362/466; 362/523; 315/79; 315/81; 307/10.8

(58) Field of Classification Search .................. 362/37, 362/466, 523; 315/79, 81; 307/10.8
See application file for complete search history.

(56) References Cited

U.S. PATENT DOCUMENTS

| | | | | |
|---|---|---|---|---|
| 5,404,278 A | * | 4/1995 | Shibata et al. ............... | 362/464 |
| 6,010,237 A | * | 1/2000 | Gotou ........................ | 362/460 |
| 6,176,590 B1 | * | 1/2001 | Prevost et al. ................ | 362/37 |
| 6,293,686 B1 | * | 9/2001 | Hayami et al. ............. | 362/465 |
| 7,036,963 B1 | * | 5/2006 | Fukawa ...................... | 362/465 |
| 2002/0039295 A1 | | 4/2002 | Kobayashi et al. | |
| 2002/0057572 A1 | * | 5/2002 | Kondo et al. ............... | 362/460 |
| 2004/0046508 A1 | * | 3/2004 | Ishida ......................... | 315/77 |
| 2005/0201111 A1 | * | 9/2005 | Fukawa et al. ............. | 362/464 |

FOREIGN PATENT DOCUMENTS

JP         2002-52975         2/2002

* cited by examiner

*Primary Examiner*—John Anthony Ward
*Assistant Examiner*—David Makiya
(74) *Attorney, Agent, or Firm*—Posz Law Group, PLC

(57) ABSTRACT

An apparatus for adjusting a direction of a light axis of a swingable auxiliary headlight of a vehicle includes a steered angle sensor detecting a steered angle of a steering wheel of a vehicle, a vehicle speed sensor detecting a vehicle speed of the vehicle, a turning radius calculating device calculating a turning radius of the vehicle on the basis of the detected steered angle and the detected vehicle speed, and a control unit performing a swivel control by which the directions of the light axes of auxiliary headlights of the vehicle are adjusted to target directions determined depending on the detected steered angle and the detected vehicle speed. The control unit is configured to control the auxiliary headlights to be in an off state while the calculated turning radius shows a value equal to or larger than a predetermined threshold.

5 Claims, 3 Drawing Sheets

APPARATUS FOR AUTOMATICALLY ADJUSTING DIRECTION OF LIGHT AXIS OF VEHICLE HEADLIGHT

CROSS-REFERENCE TO RELATED APPLICATION

This application is related to Japanese Patent Application No. 2003-425567 filed on Dec. 22, 2003, the contents of which are hereby incorporated by reference.

BACKGROUND OF THE INVENTION

1. Field of the Invention

The present invention relates to an apparatus for automatically adjusting directions of light axes or lighting areas of light beams emitted from vehicle headlights in a horizontal direction on the basis of a steered angle of a steering wheel.

2. Description of Related Art

Automatically adjusting a direction of a light axis of a vehicle headlight is known as disclosed in Japanese Patent Application Laid-Open No. 2002-52975. This document discloses a swivel control technique (beam control technique) characterized by estimating accurately a future position of a moving vehicle within a predetermined time as a current target position of light beams of swingable headlights installed on this vehicle (referred to as auxiliary headlights hereinafter) in addition to normal fixed headlights. This swivel control is for providing the driver of the vehicle with good visibility in the forward direction while the vehicle is turning.

However, this swivel control technique has a problem in that, when the vehicle makes a turn with a relatively large radius, the effect of improving the visibility in the forward direction is little, electric power of a vehicle-mounted battery is therefore consumed uselessly, and on top of that, the driver feels unnatural and awkward, even if the future position of the vehicle is estimated accurately.

SUMMARY OF THE INVENTION

The apparatus for adjusting a direction of a light axis of an auxiliary headlight of a vehicle of the invention has a structure including:

a steered angle sensor detecting a steered angle of a steering wheel of the vehicle;

a vehicle speed sensor detecting a vehicle speed of the vehicle;

a turning radius calculating device calculating a turning radius of the vehicle; and a control unit performing a swivel control by which a light axis of an auxiliary headlight of the vehicle is adjusted to a target direction determined depending on the steered angle detected by the steered angle sensor and the vehicle speed detected by the vehicle speed sensor;

wherein the control unit controls the auxiliary headlight to be in an off state while the turning radius calculated by the turning radius calculating device is equal to or larger than a predetermined threshold, and allows the auxiliary headlight to be in an on state while the turning radius calculated by the turning radius calculating device is smaller than the predetermined threshold.

With the above structure, it becomes possible to reduce the electric power consumption of a vehicle-mounted battery without a sacrifice of visibility in the forward direction, and also to reduce wearing and characteristic changing overtime of electrical components of the auxiliary headlights.

The turning radius calculating device may calculate the turning radius of the vehicle on the basis of the steered angle detected by the steered angle sensor and the vehicle speed detected by the vehicle speed sensor.

The turning radius calculating device may calculate the turning radius of the vehicle on the basis of at least one of a differential speed between a left wheel and a right wheel of the vehicle, a yaw rate of the vehicle supplied from a yaw rate sensor mounted on the vehicle, and a lateral acceleration of the vehicle supplied from a lateral acceleration sensor mounted on the vehicle.

The turning radius calculating device may calculate the turning radius of the vehicle on the basis of a forward road information, supplied from a navigation system mounted on the vehicle, about a road on which the vehicle is running.

Preferably, the threshold is set within a range between 300 m and 500 m.

PREFERRED EMBODIMENTS OF THE INVENTION

Figure 1:
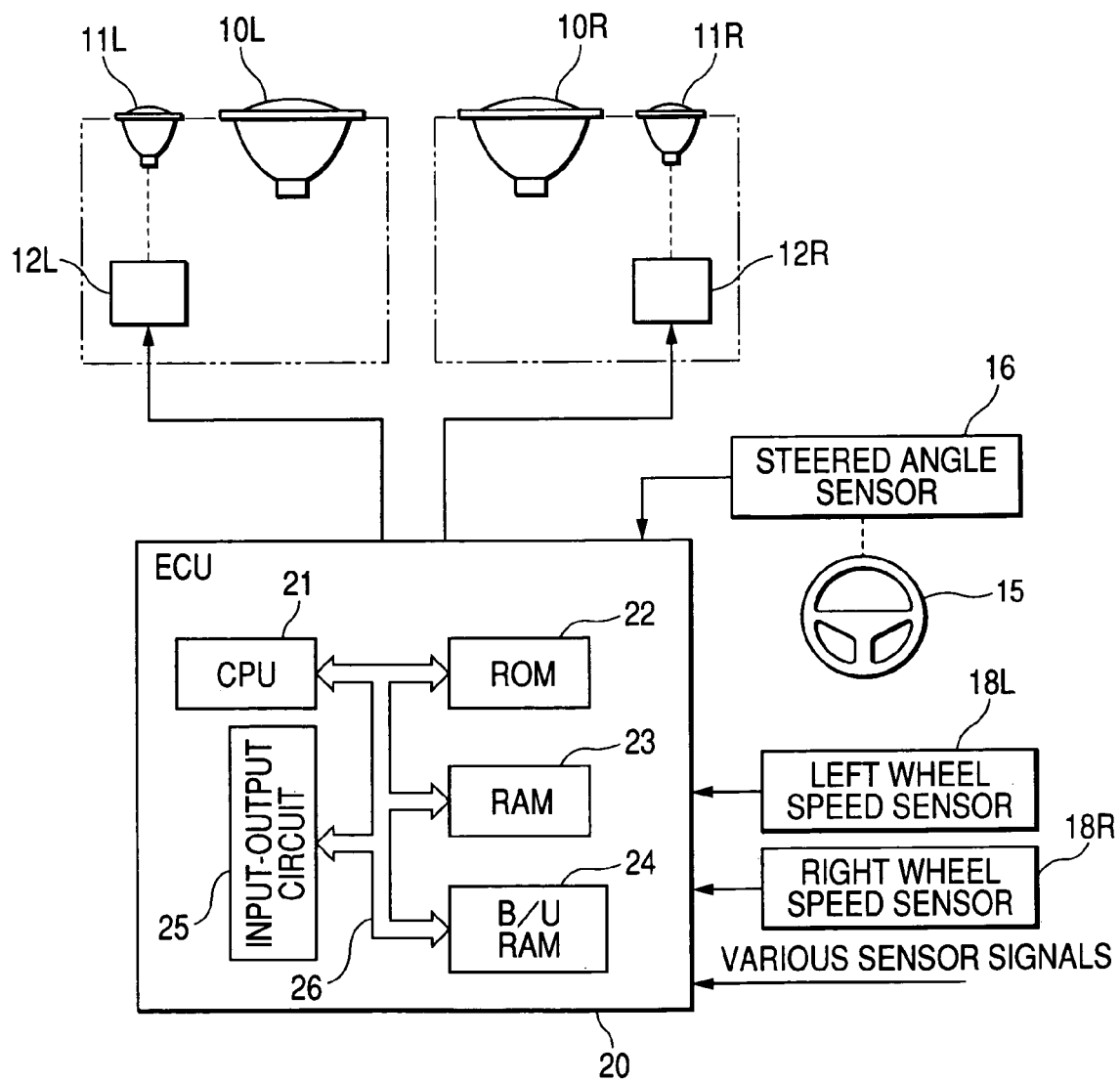
FIG. 1 is a schematic view showing an overall structure of an apparatus for automatically adjusting a direction of a light axis of a vehicle headlight according to an embodiment of the invention.

FIG. 1 shows an overall structure of an apparatus for automatically adjusting a direction of a light axis of a vehicle headlight according to an embodiment of the invention.

In FIG. 1, 10L and 10R denote left and right vehicle headlights, and 11L and 11R denote left and right auxiliary vehicle headlights additionally installed for the swivel control of light beams. The auxiliary headlights 11L and 11R are linked to actuators 12L and 12R, respectively, for adjusting the directions of the light axes of the auxiliary headlights 11L and 11R.

An ECU (Electronic Control Unit) 20 includes a CPU 21 for executing various processings, a ROM 22 for storing control programs, control maps, etc., a RAM 23 for temporarily storing various data, a B/U (Back Up) RAM 24, an input-output circuit 25, and a bus line 26 for connecting these elements.

The ECU 20 receives an output signal from a steered angle sensor 16 detecting a steered angle (angular position) θs of a steering wheel 15, an output signal from a left wheel speed sensor 18L detecting a left wheel speed VL, an output signal from a right wheel speed sensor 18R detecting a right wheel speed VR, and various sensor signals from other sensors, not illustrated. The actuators 12L and 12R act to adjust horizontally the directions of the light axes of the auxiliary headlights 11L and 11R in accordance with signals outputted from the ECU 20.

The various sensor signals may include a signal used as a parameter for calculating a turning radius of the vehicle. Such a parameter may be a yaw rate of the vehicle if a yaw rate sensor is mounted on the vehicle, or a lateral acceleration of the vehicle if a lateral acceleration sensor is mounted on the vehicle.

The ECU 20 may receive information about a radius of the road at a point 150 m ahead or a point which the vehicle is estimated to pass three seconds after as long as the current vehicle speed is kept, for example, (hereinafter referred to as "forward road information") if a navigation system is mounted on the vehicle.

Figure 2:
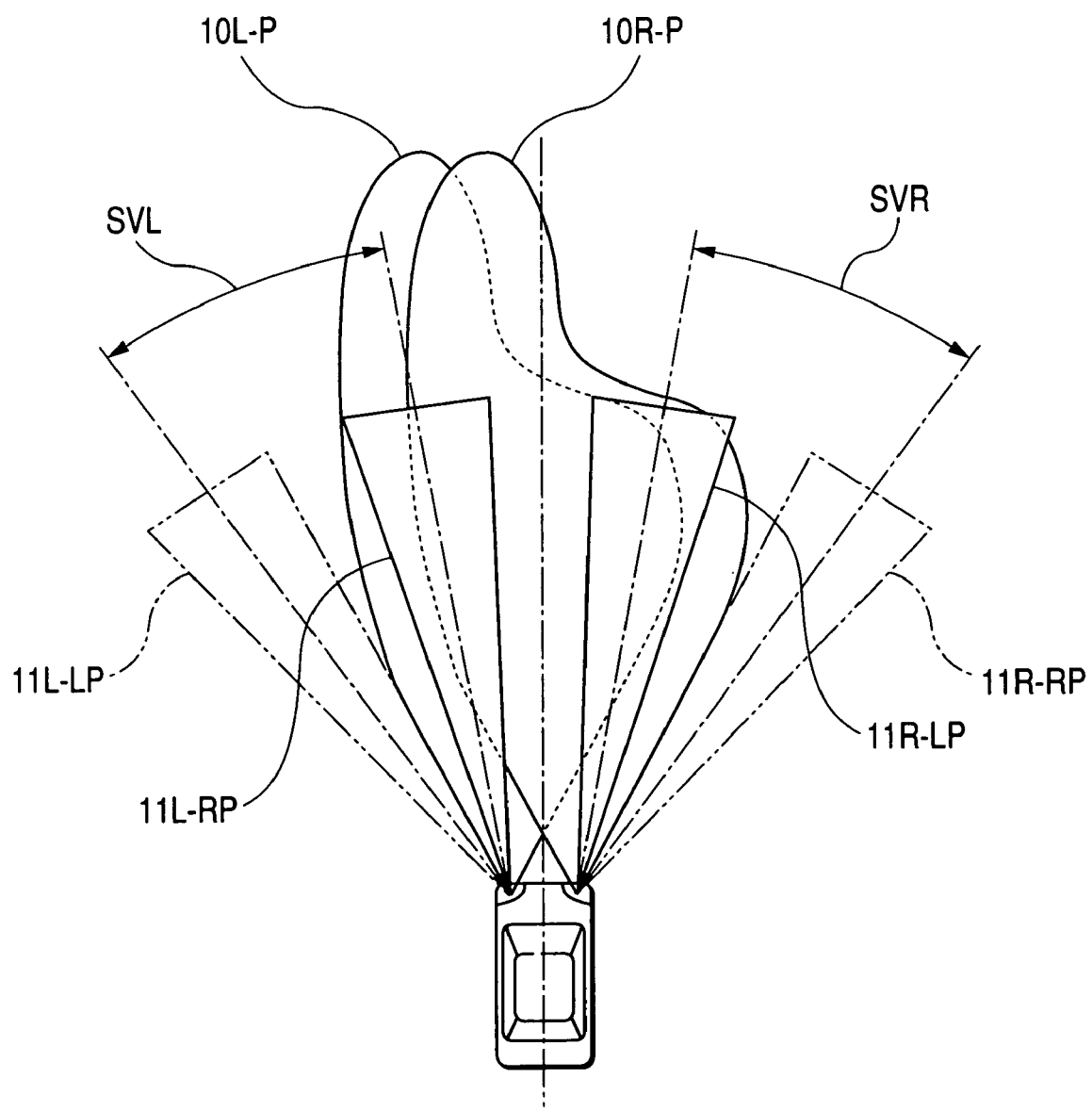
FIG. 2 is an explanatory view for explaining beam patterns of fixed headlights and swingable auxiliary headlights controlled by the apparatus according to the embodiment of the invention.

FIG. 2 shows beam patterns (low beam) of the headlights 10L, 10R and the auxiliary headlights 11L, 11R. In this figure, the solid lines 10L-P and 10R-P represent beam patterns of the fixed headlight 10L and 10R, respectively. The arched arrow SVL represents a swivel range within which the light axis of the auxiliary headlight 11L can be swiveled in accordance with the steered angle of the steering wheel 15. The chain double-dashed line 11L-LP and the solid line 11L-RP represent beam patterns of the auxiliary headlight 11L when the light axis of the auxiliary headlight 11L is in the leftmost position and the rightmost position, respectively within the swivel range SVL. The arched arrow SVR represents a swivel range within which the light axis of the auxiliary headlight 11R can be swiveled in accordance with the steered angle of the steering wheel 15. The chain double-dashed line 11R-RP and the solid line 11R-LP represent beam patterns of the auxiliary headlight 11R when the light axis of the auxiliary headlight 11R is in the rightmost position and the leftmost position, respectively within the swivel range SVR.

Figure 3:
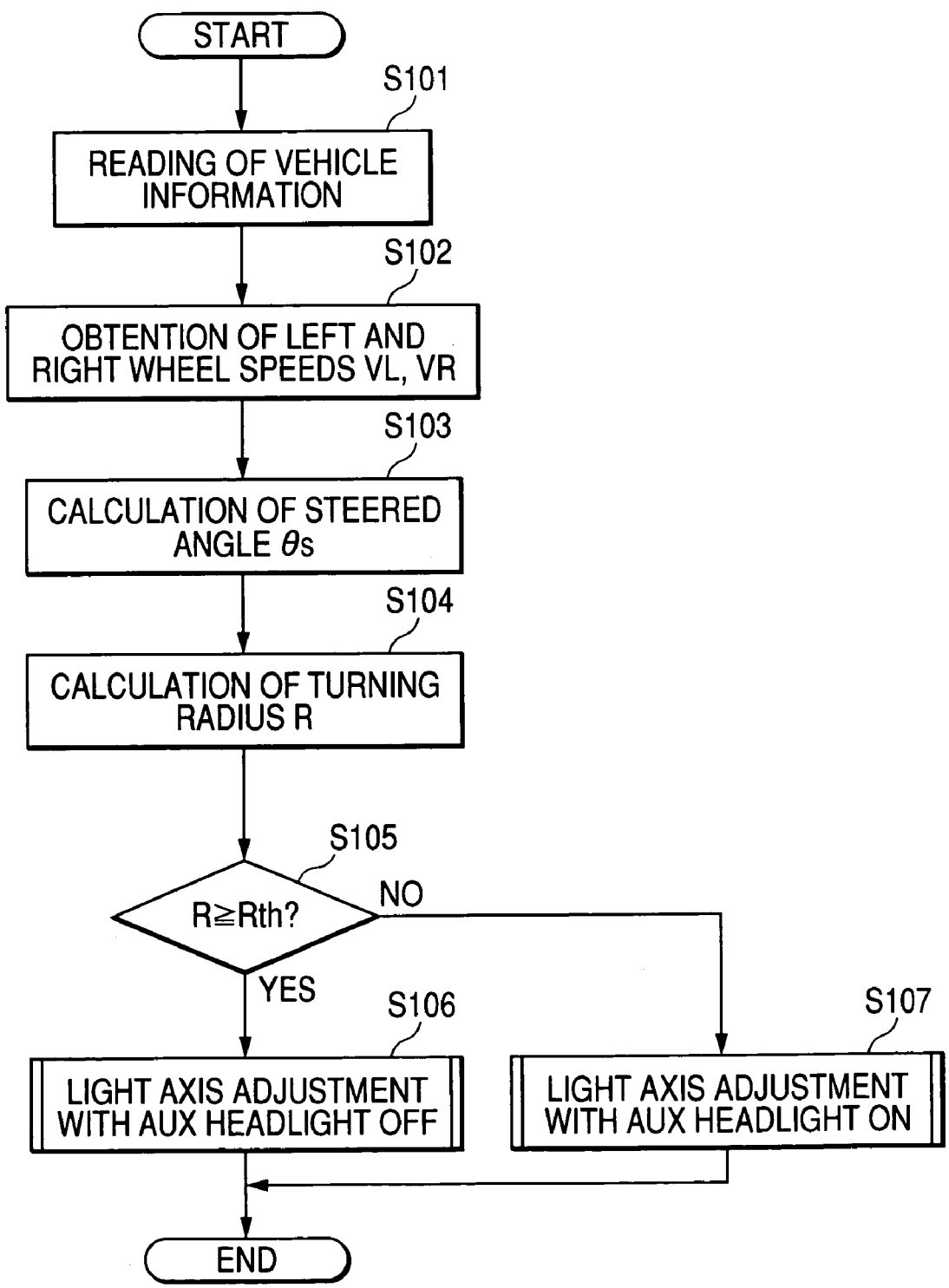
FIG. 3 is a flowchart for explaining a swivel control routine performed by a CPU within an ECU included in the apparatus according to the embodiment of the invention.

Next, a swivel control routine performed by the CPU 21 of the ECU 20 included in the apparatus according to this embodiment is explained below with reference to the flowchart shown in FIG. 3. The CPU 21 performs this swivel control routine at regular intervals.

The output signals of the steered angle sensor 16, left wheel speed sensor 18L, and right wheel speed sensor 18R are read as vehicle information at step S101. Subsequently, the left and right wheel speeds VL, VR are obtained from the output signals of the left and right wheel speed sensors 18L, 18R at step S102. Next, the steered angle $\theta s$ (radian) of the steering wheel 15 is determined on the basis of the output signal of the steered angle sensor 16 at step S103.

After that, the turning radius R (m) of the vehicle is calculated by the following equation (1).

$$R=(1+K \cdot V^2) \cdot (L/\phi s) \quad (1)$$

where $\phi s = \theta s$ divided by a steering gear ratio of the vehicle.

In the equation (1), K is a stability factor ($s^2/m^2$) of the vehicle, V is a vehicle speed (m/s) determined depending on the left and right wheel speeds VL, VR, L is a wheel base (m) of the vehicle, and $\phi s$ represents a steered angle (radian) of the tire of the vehicle.

Subsequently, at step S105, it is determined whether or not the turning radius R calculated at step S104 is equal to or larger than a predetermined threshold Rth.

If it is determined that the turning radius R is equal to or larger than the threshold Rth at step S105, the process goes to step S106 where the auxiliary headlights 11L, 11R are turned off (if they are on), however, adjusting of the directions of the light axes of the auxiliary headlights 11L, 11R is still executed to complete the swivel control routine.

As explained above, although the auxiliary headlights 11L, 11R are kept off while the vehicle is turning with a radius larger than the predetermined threshold Rth, the directions of their light axes continue to be adjusted to target directions corresponding to swivel angles calculated from the current vehicle speed V and the current steered angle $\theta s$. It enables avoiding abrupt movements of the light beams of the auxiliary headlights at the instant when the turning radius M of the vehicle becomes smaller than the threshold Rth and the auxiliary headlights are therefore turned on.

On the other hand, if it is determined that the turning radius R is smaller than the threshold Rth at step S105, then the process goes to step S107 where the auxiliary headlights 11L, 11R are allowed to turn on (if they are off), and the directions of the light axes of the auxiliary headlights 11L, 11R are adjusted to target directions corresponding to swivel angles calculated from the current vehicle speed V and the current steered angle $\theta s$ to complete the swivel control routine.

As explained above, the apparatus according to the embodiment of the invention has a structure including a steered angle sensor (16) detecting a steered angle ($\theta s$) of a steering wheel (15) of a vehicle, a vehicle speed sensor (18L, 18R) detecting a vehicle speed of the vehicle, a turning radius calculating device (constituted by the ECU 20) calculating a turning radius (R) of the vehicle on the basis of the steered angle detected by the steered angle sensor and the vehicle speed detected by the vehicle speed sensor, and a control unit (20) performing a swivel control by which the directions of the light axes of auxiliary headlights (11L, 11R) of the vehicle are adjusted to target directions determined depending on the steered angle detected by the steered angle sensor and the vehicle speed detected by the vehicle speed sensor, wherein the control unit is configured to control the auxiliary headlights to be in an off state while the turning radius calculated by the turning radius calculating device shows a value equal to or larger than a predetermined threshold (Rth), and to allow the auxiliary headlights to be in an on state while the turning radius calculated by the turning radius calculating device shows a value smaller than the predetermined threshold (Rth).

By keeping the swingable auxiliary headlights 11L, 11R off while the turning radius R of the vehicle calculated from the steered angle $\theta s$ and the vehicle speed V is equal to or larger than the threshold Rth, it becomes possible to reduce the electric power consumption of the vehicle-mounted battery without a sacrifice of visibility in the forward direction, and also to reduce wearing and characteristic changing overtime of electrical components of the auxiliary headlights.

The inventor has found through research and experimental tests that most drivers do not feel unnatural when the auxiliary headlights are turned off, if the threshold Rth is set within a range between 300 (m) and 500 (m).

Although the turning radius R of the vehicle is calculated from the steered angle $\theta s$ of the steering wheel and the vehicle speed V determined based on the left and right wheel speeds VL, VR in this embodiment, the turning radius R can be calculated from any parameter indicative of the behavior or attitude of the vehicle in the lateral direction. Such a parameter may be a differential speed between a left wheel and a right wheel of the vehicle, or a yaw rate of the vehicle, or a lateral acceleration of the vehicle. It is also possible to calculate the turning radius R based on a combination of these parameters. The turning radius R can be also obtained from the forward road information, supplied from a navigation system mounted on the vehicle, about a road on which the vehicle is running.

The above explained preferred embodiments are exemplary of the invention of the present application which is described solely by the claims appended below. It should be understood that modifications of the preferred embodiments may be made as would occur to one of skill in the art.

What is claimed is:

1. An apparatus for adjusting a direction of a light axis of an auxiliary headlight of a vehicle comprising:
   a steered angle sensor detecting a steered angle of a steering wheel of a vehicle;
   a vehicle speed sensor detecting a vehicle speed of said vehicle;
   a turning radius calculating device calculating a turning radius of said vehicle; and
   a control unit performing a swivel control by which a light axis of an auxiliary headlight of said vehicle is adjusted to a target direction determined depending on said steered angle detected by said steered angle sensor and said vehicle speed detected by said vehicle speed sensor;
   wherein said control unit controls said auxiliary headlight to be in an off state while said turning radius calculated by said turning radius calculating device is equal to or larger than a predetermined threshold, and allows said auxiliary headlight to be in an on state while said turning radius calculated by said turning radius calculating device is smaller than said predetermined threshold.

2. An apparatus for adjusting a direction of a light axis of an auxiliary headlight of a vehicle according to claim 1, wherein said turning radius calculating device calculates said turning radius of said vehicle on the basis of said steered angle detected by said steered angle sensor and said vehicle speed detected by said vehicle speed sensor.

3. An apparatus for adjusting a direction of a light axis of an auxiliary headlight of a vehicle according to claim 1, wherein said turning radius calculating device calculates said turning radius of said vehicle on the basis of at least one of a differential speed between a left wheel and a right wheel of said vehicle, a yaw rate of said vehicle supplied from a yaw rate sensor mounted on said vehicle, and a lateral acceleration of said vehicle supplied from a lateral acceleration sensor mounted on said vehicle.

4. An apparatus for adjusting a direction of a light axis of an auxiliary headlight of a vehicle according to claim 1, wherein said turning radius calculating device calculates said turning radius of said vehicle on the basis of a forward road information, supplied from a navigation system mounted on said vehicle, about a road on which said vehicle is running.

5. An apparatus for adjusting a direction of a light axis of an auxiliary headlight of a vehicle according to claim 1, wherein said threshold is set within a range between 300 m and 500 m.

* * * * *